United States Patent
Lemire

[19]
[11] Patent Number: 6,155,611
[45] Date of Patent: Dec. 5, 2000

[54] REMOVABLE TUBE CONNECTORS GAS TIGHT AT HIGH TEMPERATURES, TUBE CONNECTION PROCESS AND USAGE

[75] Inventor: Jean Lemire, Fromelennes, France

[73] Assignee: Trefimetaux, Courbevoie, France

[21] Appl. No.: 09/210,847

[22] Filed: Dec. 15, 1998

[30] Foreign Application Priority Data

Dec. 18, 1997 [FR] France .................................. 97 16427

[51] Int. Cl.[7] .................................................. F16L 37/18
[52] U.S. Cl. ........................ 285/312; 285/328; 285/320
[58] Field of Search .................................. 285/328, 312, 285/320

[56] References Cited

U.S. PATENT DOCUMENTS

| | | | |
|---|---|---|---|
| 2,757,944 | 8/1956 | Krapp | 285/312 |
| 3,779,587 | 12/1973 | Racine | 285/312 |
| 4,101,149 | 7/1978 | Fleishcer et al. | 285/320 |
| 4,225,159 | 9/1980 | Van Meter | 285/312 |
| 4,722,555 | 2/1988 | Soultatis . | |

FOREIGN PATENT DOCUMENTS

| | | | |
|---|---|---|---|
| 1164369 | 10/1958 | France . | |
| 3518019 | 11/1986 | Germany | 285/312 |
| 577137 | 4/1974 | Switzerland . | |
| 163053 | 10/1921 | United Kingdom | 285/312 |
| 2260382 | 4/1993 | United Kingdom . | |

*Primary Examiner*—Eric K. Nicholson
*Attorney, Agent, or Firm*—Dennison, Scheiner, Schultz & Wakeman

[57] ABSTRACT

A connector (1) for connecting two tubes (5, 6) by cooperation between a first element (3) fixed to a first tube (6) and a second tube (2) forming a sleeve for a second element (5) fitted at its end with a flared part (50, 51, 52, 53) by a claw (4) including a spring (44) compressing the said flared part. The said claw (4) forms a first cylindrical guide ring (40) sliding on the external cylindrical surface (32) of the first element (3) and has a recess (41) forming a cage for the spring (44). A second cylindrical guide ring (42) is fixed to the first ring (40) and sliding on the external surface (21) of the second element (2), and including a device (43) for locking/unlocking the second element (2) and the second cylindrical ring (42).

18 Claims, 8 Drawing Sheets

REMOVABLE TUBE CONNECTORS GAS TIGHT AT HIGH TEMPERATURES, TUBE CONNECTION PROCESS AND USAGE

DOMAIN OF THE INVENTION

The invention relates to the domain of removable connectors gas tight at high temperatures for connecting two tubes, one typically qualified as being "fIxed" and the other as being "mobile", so that a pressurized fluid can be transferred from one tube to the other.

The invention relates to industrial or laboratory equipment including tubes to be connected, in which one part must be disconnected from the assembly for various reasons, or treatment units for batches of tubes requiring temporary connection.

STATE OF THE ART

One example of tube batch treatment units is the treatment of copper tube coils used in air conditioning and cooling devices, which are in the form of 130 or 140 kg, or even up to 220 kg reels. These coils are subject to a final operation before packaging which consists of annealing at 600° C. under a neutral or reducing atmosphere particularly to improve the mechanical characteristics, to increase the surface gloss on the tubes and to prevent internal oxidation of the tubes.

The treatment mentioned above is also designed to improve the internal cleanliness of tubes in order to reduce the content of oil residues that may be incompatible with lubricating oils used later in compressors, or that could deteriorate the weld quality.

At the present time these treatments are carried out as follows:

- coils, placed on trays, are stacked at the entrance to a continuous furnace (4 to 5 reels per stack). Each coil corresponds to one tube weighing 50 to 300 g/m, with a length typically between 1000 m and over 4000 m.
- in order to flush air present in the tubes before the coils enter the furnace, they are purged with a neutral or reducing atmosphere, for example hydrogenated nitrogen, insertion end pieces being placed at one end of the tube for each coil.
- once the insertion end pieces have been removed without blocking the tube ends, the stacked trays are inserted in the lock of a continuous furnace in which there is a vacuum, and in which a neutral or slightly reducing atmosphere such as hydrogenated nitrogen will subsequently be formed.
- tray stacks are then inserted in the heating area of the continuous furnace, where the temperature reaches 600° C. All oil present in the tubes is carbonized, but remains in the forms of particles or films on the tube surface, particularly on the inside.
- tray stacks are then transferred into the cooling area.

Problem Caused

There is a disadvantage with the state-of-the-art treatment process for tubes; thermal degradation products of organic residues (oil residues used in manufacturing of the tube) are deposited on the tube, and particularly on the inside surface of the tube, which may make an additional degreasing treatment necessary.

Experts in this subject have already considered using a gas flow to entrain these degradation products as the trays are moved within the continuous furnace, but the problem of sealing the tube connection arises, considering firstly the high temperatures (typically 600° C.) and secondly the resulting temperature differences and expansion problems, and finally the required high pressure (typically 6 to 7 atmospheres, or 0.6 to 0.7 MPa) due to the length of the tubes and the corresponding pressure loss.

State-of-the-art connectors give a good seal at the time of the connection, in other words when cold, but the differential expansion of parts making up the connector, even if minimal, is sufficient to make the seal uncertain so that it is no longer guaranteed at high temperature.

Therefore, the applicant attempted to find reliable means of making a sealed connection at high pressure and high temperature by which he could move these degradation products using a gas flow, without polluting the continuous furnace.

The applicant also attempted to find easily removable connectors.

The term "removable" means quickly removable manually in the manner typically necessary to fit two objects such as a key and a lock together, and in the same time, in other words in a few seconds.

DESCRIPTION OF THE INVENTION

According to a first purpose of the invention, a connector for two tubes gas tight at temperatures between ambient temperature and a usage temperature of at least 600° C., by cooperation of a first element fixed to a first tube and a second element forming a coil for a second tube fitted with a flared part at its end, using a system for locking/unlocking the said first and second elements, comprising a spring compressing the said flared part into contact with the said sealing surface of the said first element, using a sealing element on the said second element, characterized in that:

a) the diameter of the said sealing element of the said second element varies with the diameter of the said second tube, while the said sealing surface of the said first element remains constant regardless of the diameter of the said second tube, b) the contact surface forming the said seal by compression of the said flared part comprises at least a sealing circle formed by a tangential "arc on plane" contact with variable diameter depending on the diameter of the said second tube, between the said flared part and the said sealing surface, in order to seal the said connector regardless of the temperature and corresponding expansion of the said connector, c) the materials forming the said connector are chosen from materials which have mechanical characteristics at least equivalent to the characteristics of the said second tube at the same temperature of use.

The connectors according to the invention provide a removable connection between the two tubes, gas tight at high temperatures.

This is done by fixing the first tube to the said first element, in a sealed manner known in itself.

The said second tube is fixed to the said second element, typically by a simple expansion operation on the end of the said tube, widening its diameter above the diameter of the coil formed by the said second element, and thus forming the said flared part.

The said first element and the said second element are fitted with facing sealing surfaces which cooperate with each other, due to their geometry. These surfaces, referred to as the "sealing surface" for the said first element and the "sealing element" for the said second element, compress the said flared part into contact with the said sealing surface and thus provide the seal between the said second tube to be connected and the said connector.

The said locking/unlocking system includes a spring that holds the said sealing surfaces adjacent to each other in order to compress the said flared part in contact with the said sealing surface along a sealing circle formed by a tangential "arc on plane" type contact line, with a pressure related to the characteristics of the said spring and sufficient to provide the required seal. An "arc on plane" contact means any tangential contact between two surfaces with different radii of curvature, as opposed to a "plane on plane" contact, and the "arc on plane" contact (at least in theory) forms a circular line of tangency considering the axial symmetry of the said flared part.

The applicant has observed that under these conditions, a seal is possible at any temperature despite the expansion of parts making up the said connector. He concluded that starting from a sealing contact line when cold, the "arc" part should slide along the "plane" part remaining sealed, regardless of the expansion of the parts forming the said connector, and regardless of the temperature or heating or cooling thermal cycles, connection/disconnection of the said second tube to be connected remaining easy due to use of the said locking/unlocking system.

Therefore, the invention is capable of solving the problem caused and consequently opens up new possibilities particularly for tube treatment.

Thus, connectors according to the invention providing almost perfect gas tightness enable treatments that were impossible using the state-of-the-art, particularly with different gases inside the tubes and in the treatment furnace chamber.

Connectors according to the invention can be used for a large number of heating and cooling cycles without degrading their seal.

DESCRIPTION OF THE FIGURES

All the figures are specifically related to the invention, except for FIG. 7 which is also related to the state-of-the-art.

The right part of these figures shows two cases corresponding to two different second elements (2), therefore to two different diameters of the said second tubes to be connected (5a, 5b), the upper part of the figure corresponding to the smallest diameter, and the bottom part to the largest diameter.

Figure 1:
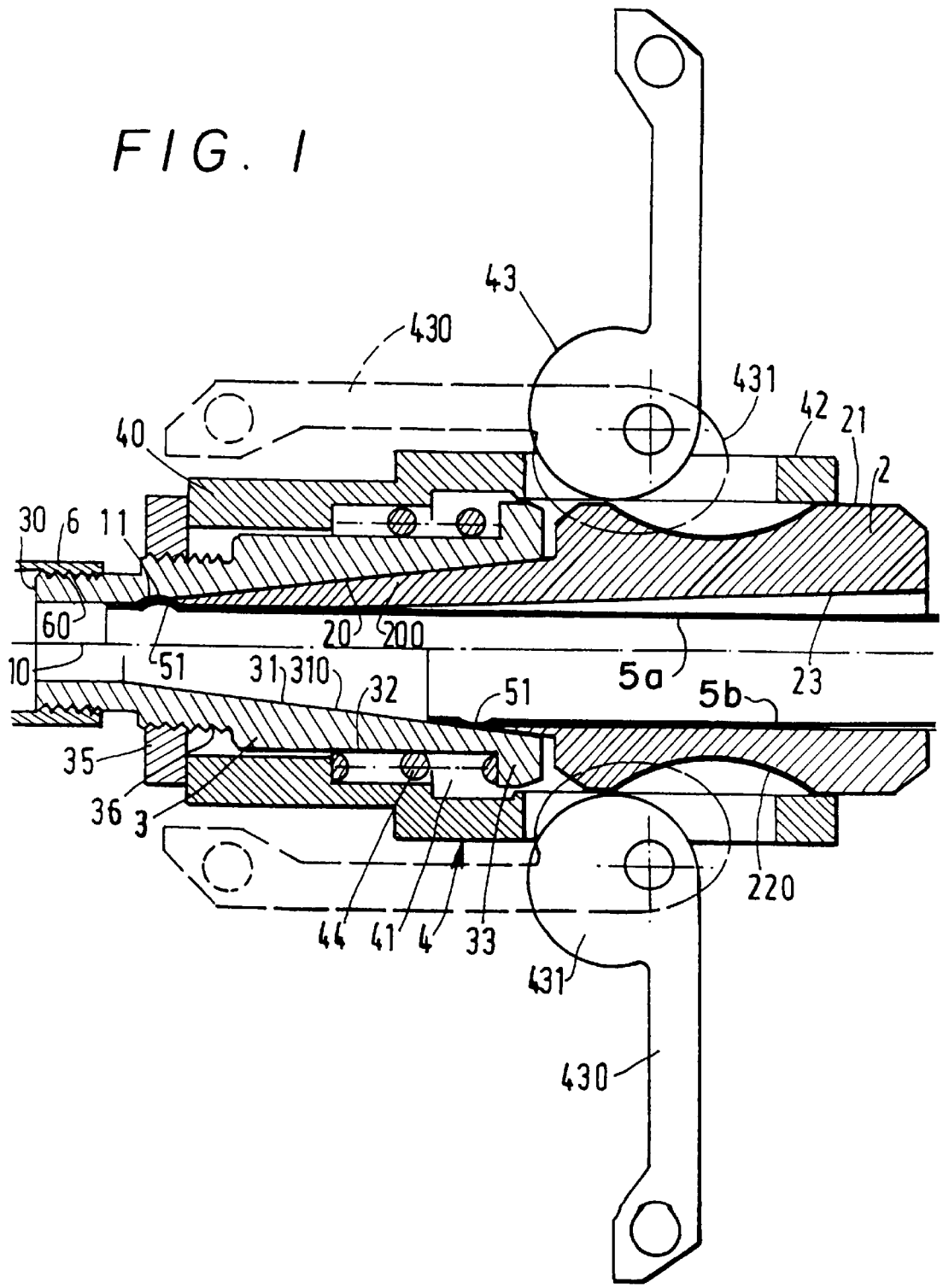
FIGS. 1 to 5 are axial sections along axis (10) through connectors (1) according to the invention.
Figure 2:
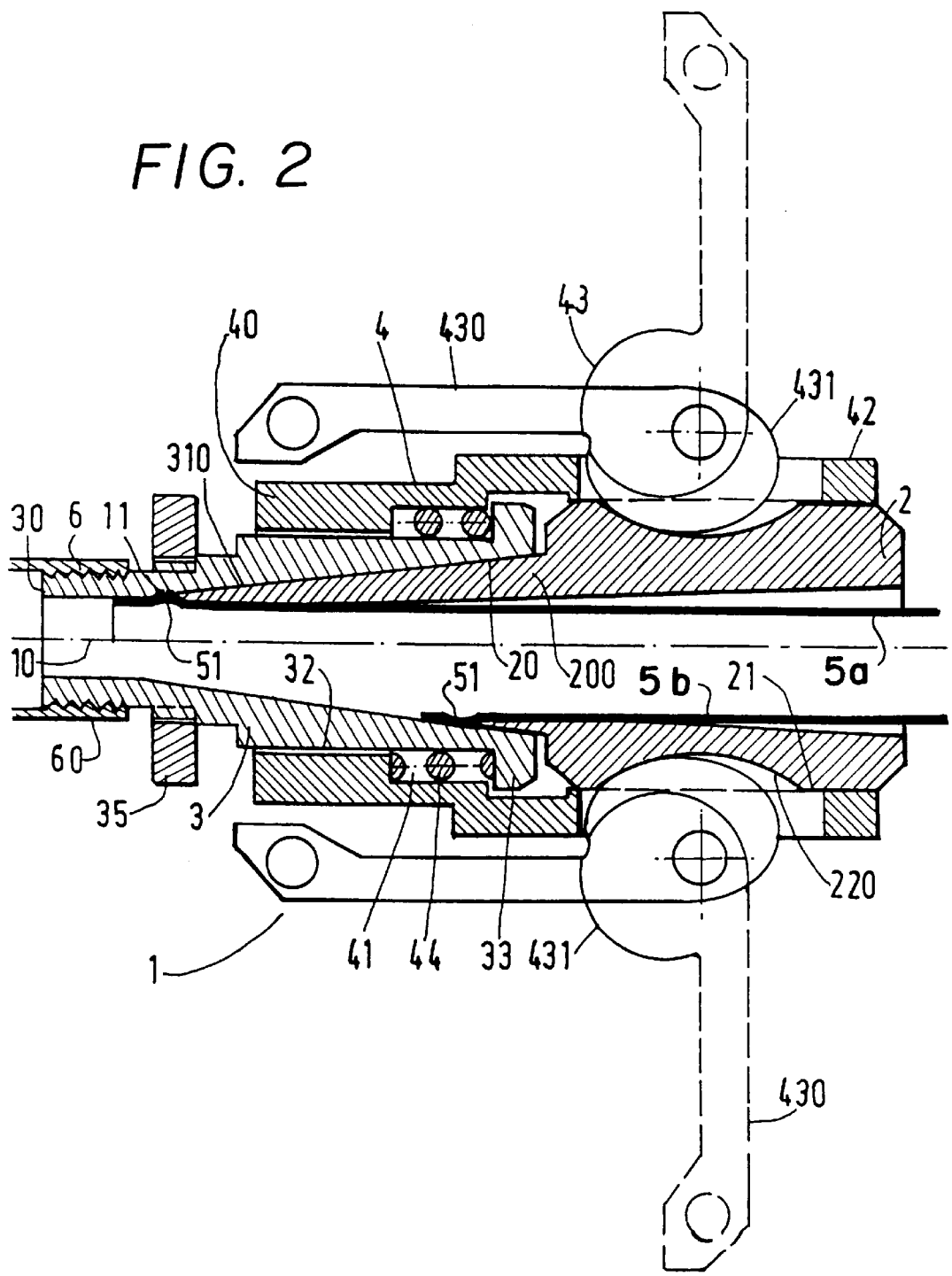

FIGS. 1 and 2 show one embodiment of the invention, the said locking/unlocking means (43) being in the "unlocked" position in FIG. 1, and in the "locked" position in FIG. 2.

Figure 3:
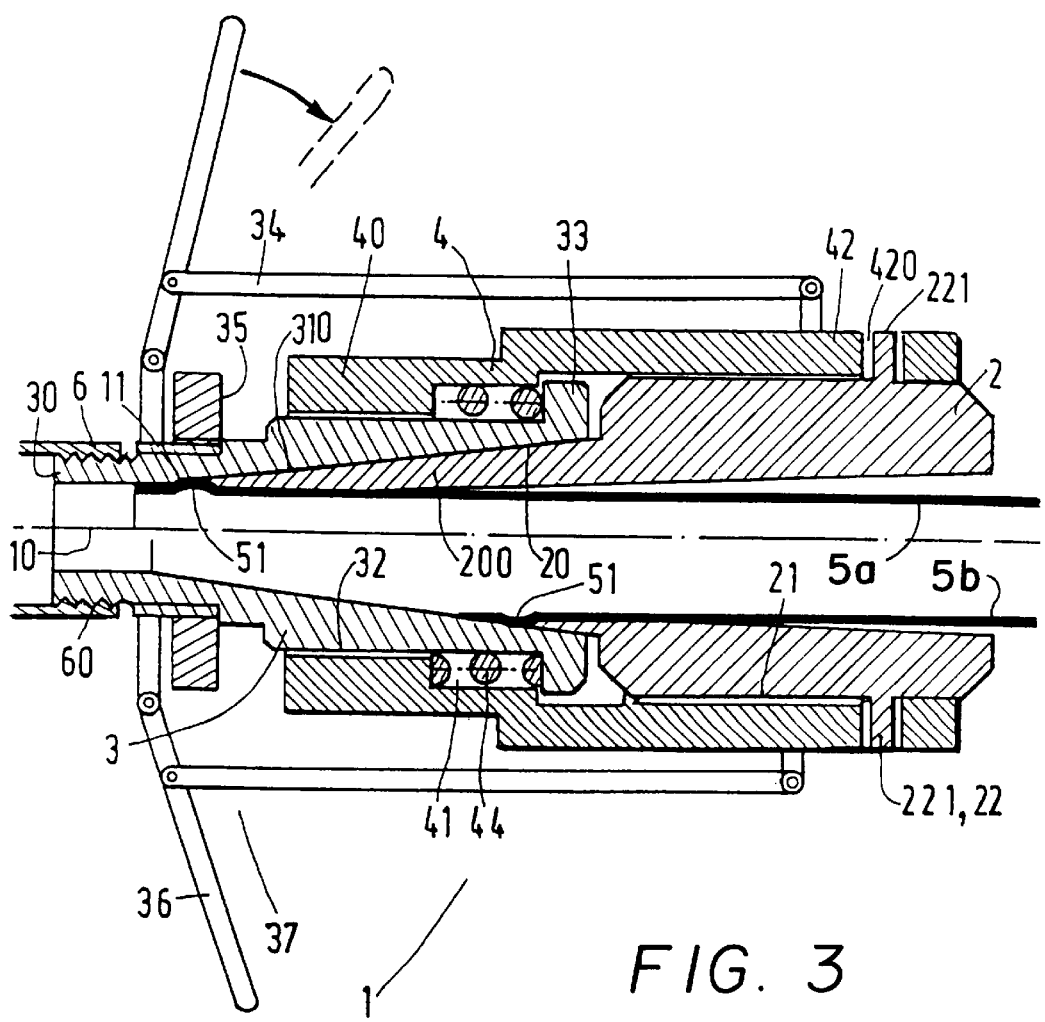
Figure 4:
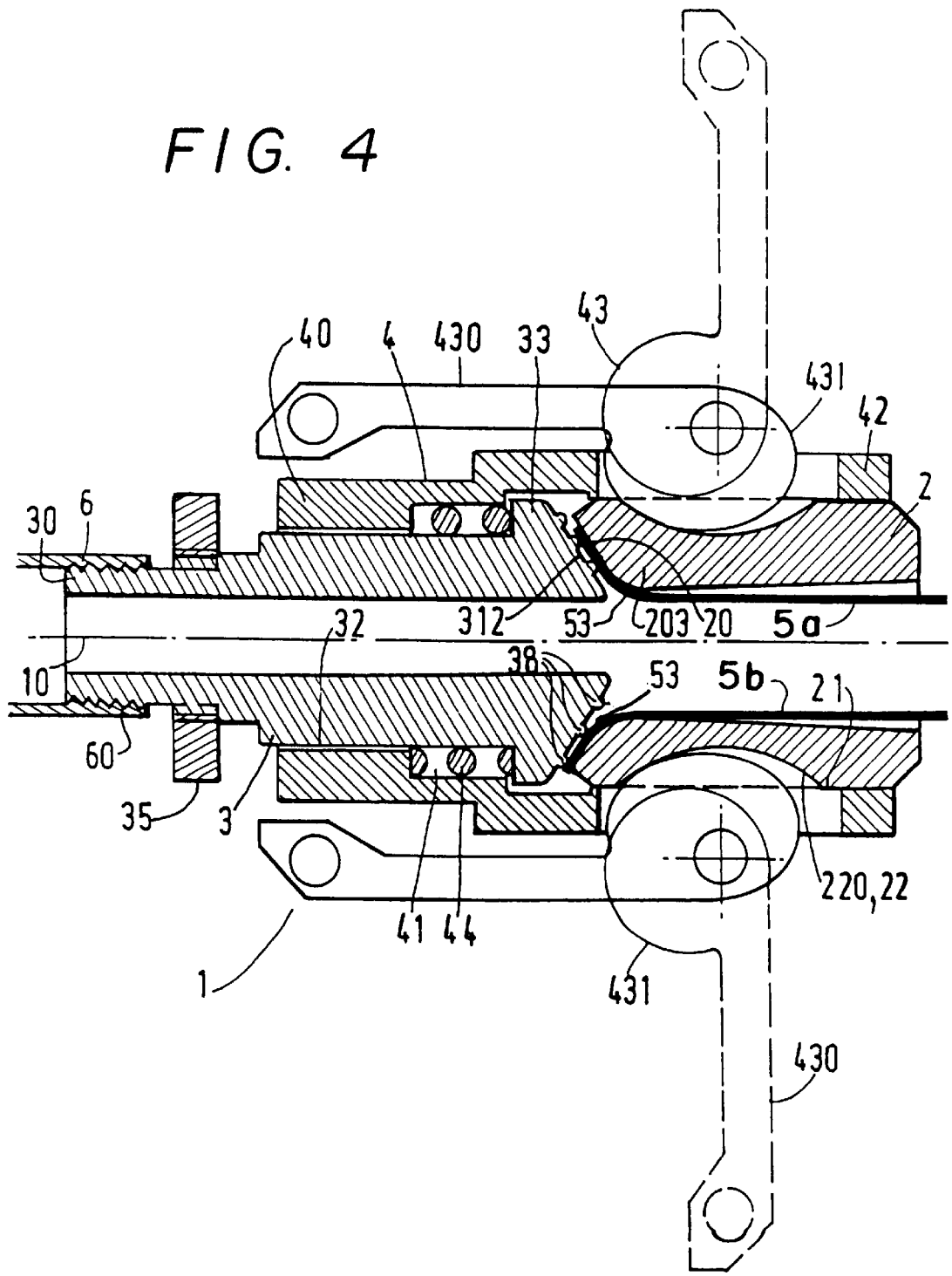
Figure 5:
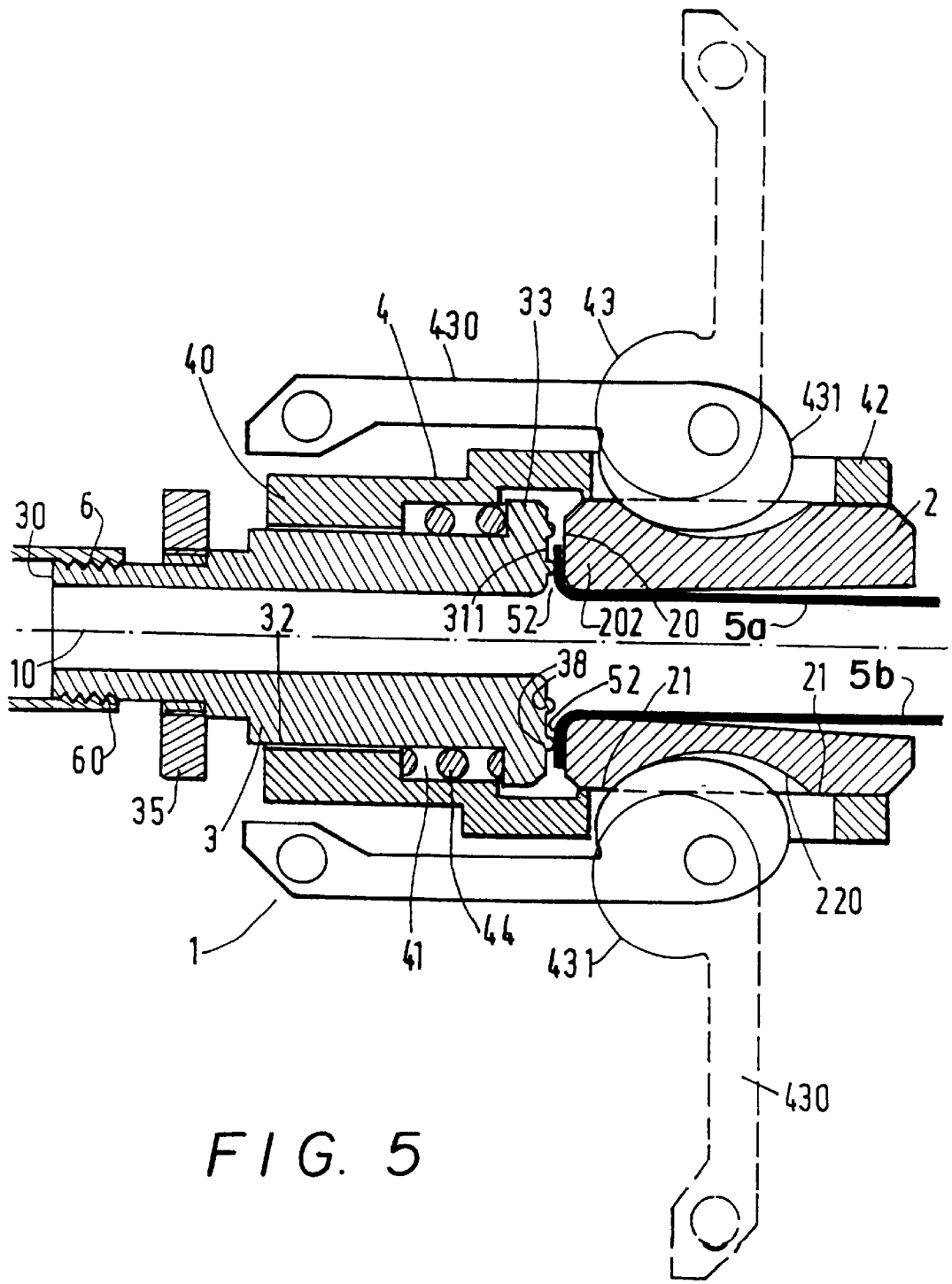

FIGS. 3, 4 and 5 show other embodiments of the invention in the "locked" position only.

Figures 3A, 3B:
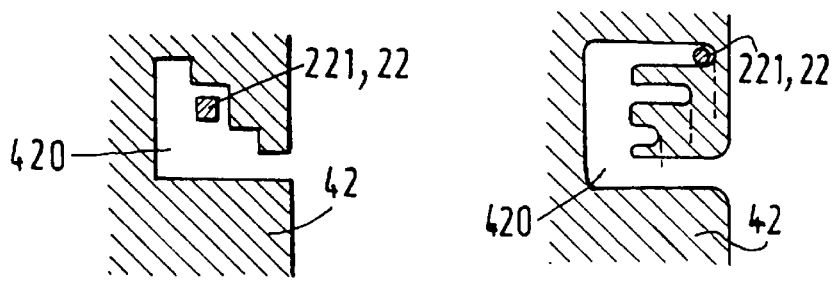

FIG. 3a is a top view of the end of the second cylindrical guide ring (42) of the said locking system (4) with three steps, a pin (221) rigidly attached to the said second element (2) being compressed by one of the steps.

FIG. 3b is a variant of FIG. 3a, with notches instead of steps.

Figure 6:
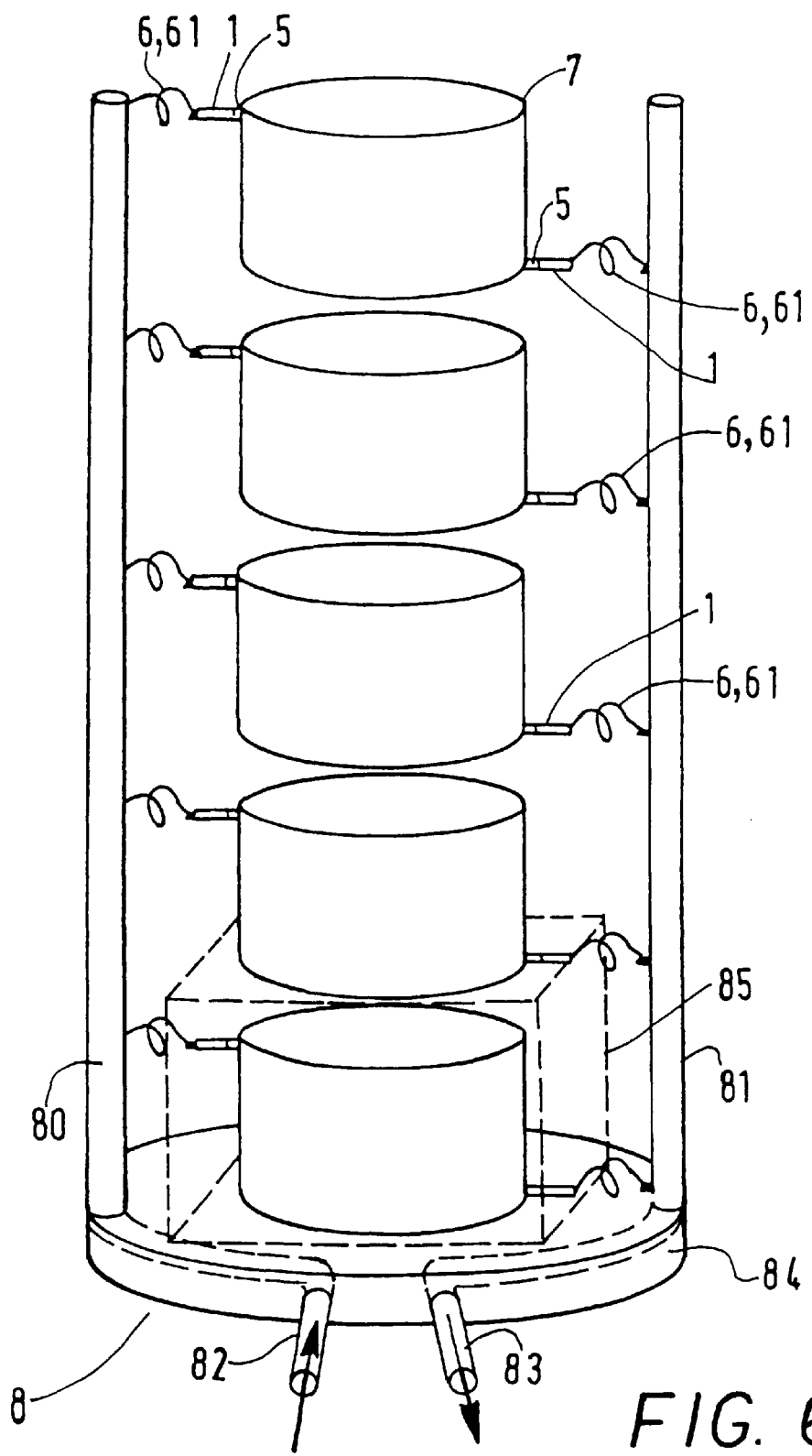

FIG. 6 is a perspective view of a coil (7) stacking device (8), each coil being on a tray (85), only one of which is shown in dashed lines. Each end of the tube forming the coil (7) is fitted with a connector (1) according to the invention for creating a sealed connection with a feed manifold (80) and an outlet manifold (81) through a flexible tube (6, 61).

Figure 7:
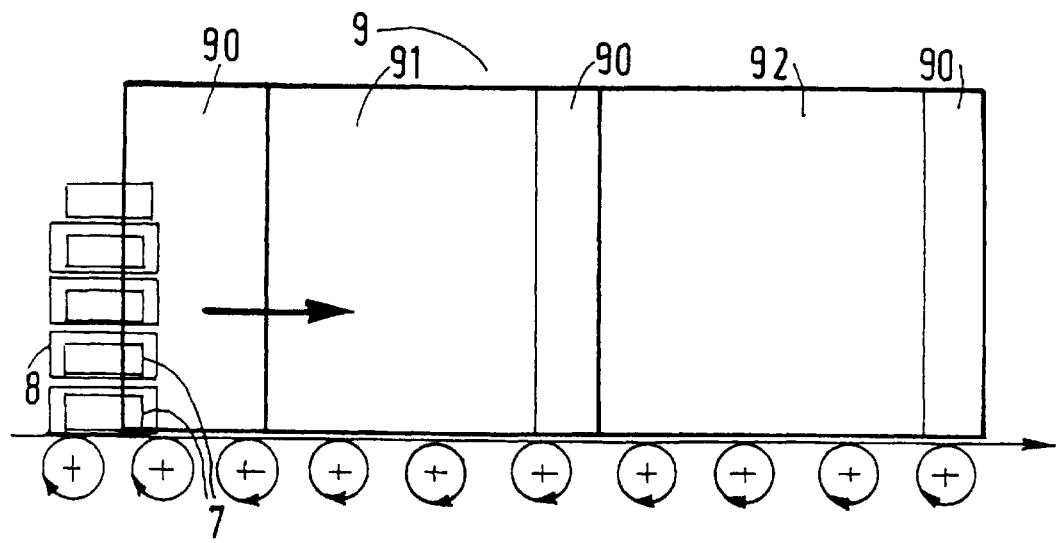

FIG. 7 is a longitudinal section view of a continuous furnace used for the treatment of stacks of copper tube coils.

FIGS. 8 to 14 are axial sections of the said flared part (50, 51, 52, 53, 54) and the said sealing surfaces varying depending on the shape of the said flared part and the said sealing surfaces.

Figure 8:
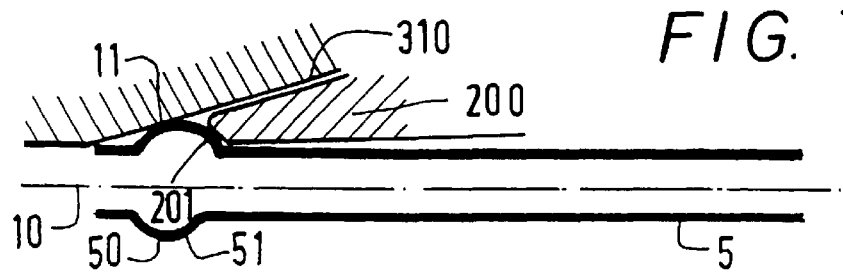

The flared part (51) in FIG. 8 is a detail of the flared part of FIGS. 1 to 3, reference (11) corresponding to the sealing circle.

Figure 9:
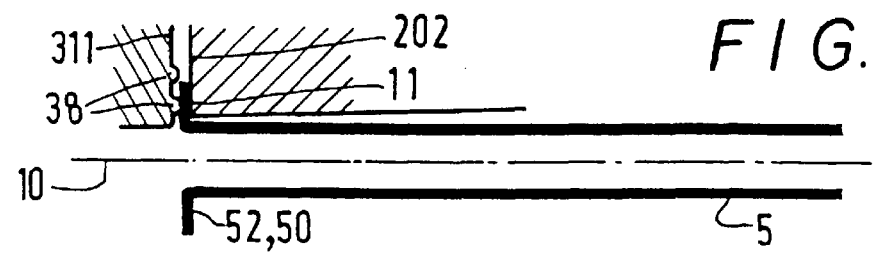
Figure 14:
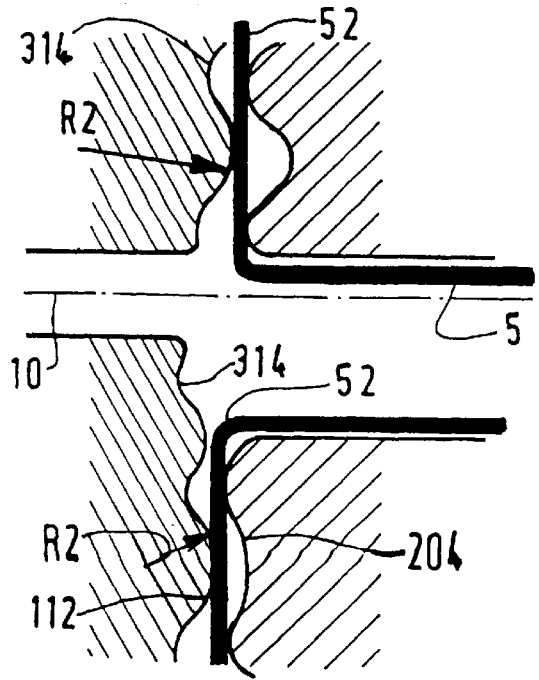

The flared part (52) in FIG. 9 and in FIG. 14 corresponds to the part in FIG. 5.

Figure 10:
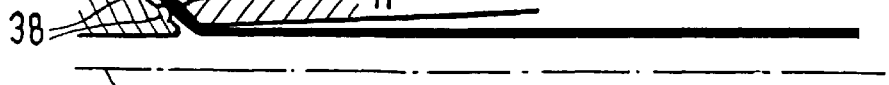
Figure 12:
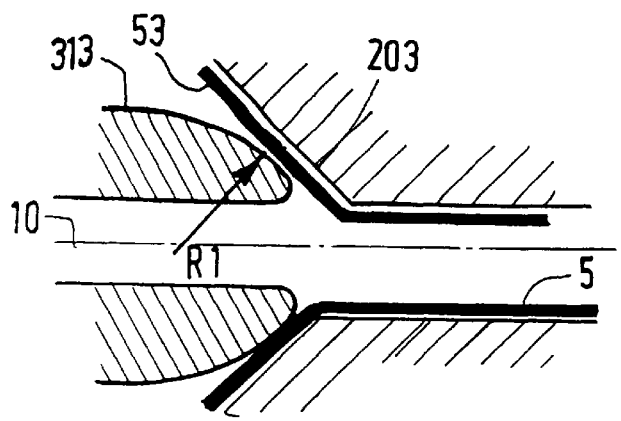
Figure 13:
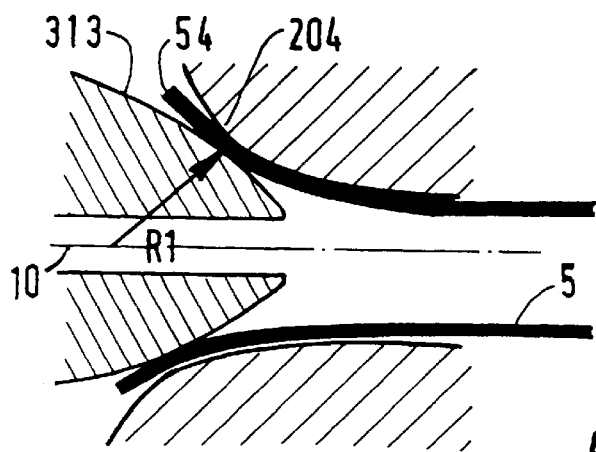

The flared part (53) in FIG. 10 and in FIGS. 12 and 13 correspond to the part in FIG. 4.

Figure 11:
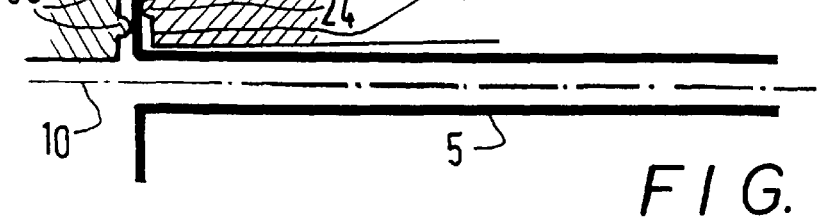

In FIGS. 9 to 11, reference (38) shows a circular rib with a low radius of curvature, typically from 1 to 5 mm, formed by the said sealing surface (31, 310, 311, 312) and providing the said tangential "arc on plane" contact, whereas reference (24) shows a circular rib with a low radius of curvature, typically 1 to 5 mm, formed by the said sealing element (20, 201, 202, 203), the sealing circles being denoted by reference (11), except in FIG. 11 in which references (110) and (111) are used, the rib (24) of the said sealing element (202) being included between the circles (110, 111) formed by the ribs (38) on the sealing surface (311).

In FIGS. 12 to 14, the said circular rib with a small radius of curvature (38) is replaced by the curvature of the said sealing surface (313, 314), along a radius of curvature R1 (FIGS. 12 and 13) or R2 (FIG. 14) significantly greater than the radius of curvature of the said rib (38).

In FIG. 12, the sealing element (203) forms a plane, whereas it forms an arc (204) in FIG. 13, the said sealing surface (313) forming a curve with a radius of curvature R1 at the point of tangency with the said conical flared part (53) (in FIG. 12) or the said curved flared part (54) (in FIG. 13).

In FIG. 14, the sealing surface (314) and the sealing element have surface curvatures that cooperate, the radius of curvature R2 being smaller than the radius of curvature R1 in FIGS. 12 and 13.

Whenever possible, the same references have been used for the corresponding elements in all figures.

DETAILED DESCRIPTION OF THE INVENTION

According to a first embodiment of the invention, and in order to form an "arc on plane" contact, the "arc" part is the contact part on the said flared part (50) and the "plane" part is the contact part on the said sealing surface (310), as shown in FIGS. 1 to 3 and FIG. 8. In this case, the said flared part may be formed by an annular protrusion (51) in sealed tangential contact with the said plane sealing surface (310).

Therefore, the seal is made by the sealing circle (11), an annular area of tangency between the said flared part (51) and the said sealing surface (310).

These FIGS. 1 to 3 and 8 illustrate a connector (1) in which the said cooperation is of the conical type, in which the said first element (3) is a female element comprising an inner conical surface (310) as the sealing surface, in which the said second element (2) is a male element comprising a conical end piece (200) with a trapezoidal end piece (201) forming a sealing element (20) that fits into the said inner conical surface (310) and in which the said flared part (50) is a annular protrusion (51) forming a sealing circle (11) at the area of tangency with the said inner conical surface (310).

According to a second embodiment of the invention, and in order to form an "arc on plane" type contact, the "arc" part is the contact part on the said sealing surface, typically by means either of a curved surface (313, 314) or a circular rib (38) and the "plane" part is the contact part on the said flared part (52, 53).

This embodiment is shown in FIGS. 4, 5, 9, 10, 11 in the case of sealing surfaces provided with at least one circular rib (38), and in FIGS. 12, 13 and 14 for sealing surfaces with curved surfaces (313, 314), the difference between these variants lying principally in the radius of curvature which is typically less than 5 mm in the case of ribs (38) and is greater than 5 mm in the case of curved surfaces (313, 314).

The said sealing surface may include two circular ribs (38) forming two sealing arcs (110, 111) and in which the said sealing element comprises at least one circular rib (24) with a radius intermediate between the radii of the two arcs (110, 111) as shown in FIG. 11, and possibly two other circular ribs (24) located con the inside and outside of the two sealing arcs, in order to provide uniform compression.

FIGS. 4 and 10 illustrate a connector (1) in which the said cooperation is of the conical type in which the said first element (3) is a male element in which the sealing surface is an outer conical surface (312) fitted with circular ribs (38) in which the said second element (2) is a female element comprising a conical end piece (203) forming the sealing element (20) containing the said outer conical surface (312), and in which the said flared part (50) is a conical end piece (53).

FIGS. 5, 9 and 11 illustrate a connector in which the said cooperation is of the plane type, in which the sealing surface of the said first element (3) is a plane sealing surface (311) fitted with circular ribs (38), in which the said second element (2) comprises a plane end piece (202) forming the sealing element (20), and in which the said flared part (50) is a plane coil (52).

FIGS. 12 and 14 illustrate a connector (1) in which the said first element (3) comprises a non-plane sealing surface (313, 314) forming a tangential "arc on plane" contact with the said flared end (52, 53, 54).

In all these embodiments, the seal is formed along at least one sealing circle (11) between the said sealing surface (31, 310, 311, 312, 313, 314) and the said flared part (50, 51, 52, 53, 54), which corresponds to a type of seal that the applicant has recognized is useful to create, in order to solve the problem caused.

The connector (1) according to the invention comprises a locking/unlocking system. Any known system enabling fast connection/disconnection or assembly/disassembly of the said second tube (5a, 5b) to be connected, and including a spring or equivalent means in order to provide the compression, may be suitable. One suitable system could be of the "claw" type (4).

In the system illustrated in FIGS. 1 to 5:
a) the said first element (3) also comprises a cylindrical external surface (32) providing axial guidance for the said claw (4) and the said spring (44), and a means, typically a stop (35) and a shoulder (33) limiting the axial displacement of the said claw (4), and a cylindrical sealed connection end piece (30) to the said first tube (6),
b) the said second element (2) also has an external guide surface (21) with a predetermined diameter, and an internal surface (23) with a variable inside diameter adapted to the inside diameter of the said second tube (5a, 5b),
c) the said claw (4) forms a first cylindrical guide ring (40) sliding on the said external cylindrical surface (32) of the said first element (3), with a recess (41) forming a cage for the said spring (44), a second cylindrical guide ring (42) rigidly attached to the said first ring (40) and sliding on the said external surface (21) of the said second element (2), and comprises locking/unlocking means (43) of the said second element (2) with the said second cylindrical ring (42).

According to the invention, the said locking/unlocking means (43) of the said second element with the said second cylindrical ring comprises a means of displacing the said claw (4) axially, typically a manual means (430), from a "locked" position to an "unlocked" position by means of a spring (44) in "high tension" and in "low tension" respectively, and a means (43 and 22, 221 and 420) of fixing/separating the said second cylindrical ring (42) of the said claw (4) and the said second element (2).

As illustrated in FIGS. 1, 2, 4 and 5, the said displacement means and the fixing/separation means may be made by meshing or cooperation of a cam (431) fixed to the said claw (4), typically fixed to the said second cylindrical ring (42) and fitted with an arm (430) capable of rotating it, with a recess or groove (220) in the said external guide surface (21) of the second element (2), in order to cause axial displacement of the said second element (2) and compression of the said flared part (50).

As illustrated in FIG. 3, the said displacement means may be supported on the said first element (3) and the said means of fixing/separation includes cooperation of pins (221) in the said second element (2) with notches or recesses (420) at the end of the said second cylindrical ring (42).

In the "locked" position shown in FIGS. 2 to 5, the said claw (4) is "mechanically" fixed to the said first element (3), and the sealing surfaces are at least partly in compression due to the said spring (44) which is in "high tension". In these figures, the compressed spring (44) tends to move the said claw (4) towards the left, assuming that the said first element (3) is fixed, which mechanically creates compression of the said second element (2) in contact with the said first element (3).

However in the "unlocked" position, the said second element (2) is free to move axially, and can therefore be separated from the said claw (4) and the said first element (3).

There are many other locking/unlocking means (43) equivalent to those shown in FIGS. 1 to 5, which may be used within the invention.

According to the invention, the return force of the said spring (44) in the "locked" position can be adjusted by varying the displacement of the said claw (4) necessary to fix the said second cylindrical ring and the said second element.

For example, FIGS. 3a and 3b show a recess (420) in the end of the second cylindrical axial guide ring (42) which has steps as shown in FIG. 3a or notches as shown in FIG. 3b, with which pins (221) fixed to the external surface (21) of the said second element, come into contact. A different axial displacement of the said claw (4) corresponds to each step or notch, resulting in a different compression force in the said spring (44).

The connectors (1) according to the invention are composed of an assembly of metal and/or ceramic parts (2, 3, 4, 44) which maintain their mechanical properties during a large number of heating cycles consisting of warming, holding the temperature and then cooling.

A tungsten spring is particularly advantageous for this purpose.

In particular, in the case of the embodiments shown in FIGS. 4 and 5, it is advantageous if the pressure exerted by the said spring is chosen so that the said connector is tight at 600° C.

It is advantageous if these mechanical properties are higher than the properties of the said second tube to be connected (5a, 5b), particularly for the hardness, such that any localized deformation at the said sealing circle (11) during the said compression, occurs on the said flared part (50, 51, 52, 53, 54) rather than on the said sealing surface, the geometric shape of which must remain unchanged throughout the life of the said connector (1).

Another purpose of the invention is a process for manufacturing a connector (1) in which:
a) the said first (3) and second (2) elements, the said locking/unlocking system (4) are supplied with the said spring (44), the said first (6) and second (5a, 5b) tubes,
b) the said first element (3), the said locking/unlocking system (4) and the said spring (44) are assembled, followed by the said first tube (6), typically by threading (60),
c) one end of the said second tube (5a, 5b) is inserted into the said second element (2), and the said flared end (50, 51, 52, 53, 54) is formed depending on the nature of the said cooperation,
d) the two parts formed in b) and c) are connected.

In step c) of the process, it may be advantageous to use the said second element to flare the said end of the tube to be connected, as illustrated in FIGS. 4, 5, 9, 12 and 13, where it can be seen that the metal in the end of the tube has been pushed back into contact with the inside surface or sealing element of the said second element (2). In all cases, the flared end of the said tube to be connected has a degree of freedom in the axial direction, with respect to the said second element (2) such that, after the said connector (1) has been used and unlocked, the said second element is recovered by sawing the tube below the said second element, and sliding the said second element.

Another purpose of the invention is the use of connectors (1) in any industrial or laboratory equipment or devices and processes involving fluid circulation at high temperature and high pressure, in tubes which must be periodically or frequently uncoupled from the assembly of the said equipment or devices.

Another purpose of the invention is the use of connectors and their manufacturing process for the treatment of metal tube coils (7), typically copper based, at high temperature (typically 600° C.) by the circulation of fluids inside the tubes.

One example is the use of connectors (1) for the treatment of metal tube coils (7), typically copper based, in a high temperature furnace (typically 600° C.), with circulation of fluids inside the tubes and particularly evacuating the fluids circulating inside the tubes outside the furnace, and with possible circulation of gaseous fluids inside the said furnace and outside the said tubes, the said gaseous fluids having a different nature from the nature of the said fluids circulating inside the said tubes.

EXAMPLE EMBODIMENTS

All connectors in FIGS. 1 to 5 were made of steel by machining, with a tungsten spring.

FIGS. 1, 2, 3, 4 and 5 are at a scale of approximately 1.5:1.

First Example

In the connectors in the FIGS. 1 and 2:
A) the said first element (3) is a single piece part comprising:
a cylindrical connection end piece (30) which is threaded (60) for connection to a first tube (6),
a body, the inside surface of which forms a conical sealing surface (31, 310) and the outside surface of which is stepped; a first step (36) is threaded to fix the stop (35) in an appropriate axial position; a second step forms an external cylindrical surface (32) for guidance of the claw (4) and terminates with the shoulder (33) against which the said spring (44) stops.
B) the said locking/unlocking system is of the "claw" type (4) composed of a single piece part formed of two cylindrical rings, a first cylindrical ring (40) providing axial guidance for the said first element (3) including a recess (41) in which the said spring (44) is placed, a second cylindrical ring (42) providing axial guidance of the second element (2) in the part with an orifice, and fitted with a locking means (43) forming a cam (431) and an arm (430).

The claw (4) is assembled immediately; the spring is put into contact with the shoulder (33), and the claw (4) is then slid along the guide surface (32) and its axial movement is stopped by the stop (35), which is threaded so that the axial positioning can be varied.

C) the said singlepiece second element (2) comprises a conical end piece (200), the external surface (20) of which forms a sealing surface, extended by a part with a cylindrical external surface (21) with a groove (220) with a profile adapted to the profile of the cam (431), to control their cooperation and the resulting locking.

In this case, the said flared part (50) of the second tube (5a, 5b) to be connected is a annular protrusion (51) as shown in FIG. 8, formed after the said second tube (2) has been slid into the said second element (2).

The connector (1) is shown in the "unlocked" position in FIG. 1, the arm (430) being lifted and the claw (4) being pressed in contact with the stop (35); in this case, the second element (2) may slide inside the second guide ring (42) of the claw (4) in order to make the sealing surfaces cooperate with each other (the surface (31, 310) of the first element (3) with the surface (20, 200) of the second element (2)).

By tipping the arm (430), the cam (431) cooperates with the groove (220) and moves the claw (4) towards the right, which pushes the spring (44) into compression, which forces the second element (2) into contact on the first element (3) in a sealed manner.

Second Example

This example illustrated in FIG. 3 is similar to the first. The main difference is the means of locking/unlocking. In this example, this means (37) is a means of axially displacing the claw (4) supported on the said first element (3) and comprising a hinged arm (36) and rod (34) set. In this example, the spring (44) is attached and the compression force is transmitted by means of cooperation between pins (221) fixed on the said second element (2), with the second guide ring (42) by means of a recess (420) with steps illustrated in FIG. 3a, so that a variable compression of the spring can be chosen depending on the pressure of the fluid that will pass inside the tubes, or the required degree of seal.

Third Example

This example shown in FIG. 4 is different from the first example firstly in that cooperation between the said first element and the said second conical element is reversed, the said first element (3) becoming the male element and the said second element (2) becoming the female element, and in that secondly the flared part (50) of the second tube (5a, 5b) to be connected is a conical ring (53) as illustrated in FIG. 10, which is compressed between the sealing surfaces (312) of the first element (3) and (20) of the conical end piece (203) of the second element (2).

Fourth Example

This example shown in FIG. 5 differs from the third example in that firstly, cooperation between the said first and the said second element is not conical, but is perpendicular to the axis (10) of the connector (1) and in that secondly, the flared part (50) of the second tube (5a, 5b) to be connected is a conical ring (52) as shown in FIG. 9, which is compressed between the sealing surfaces (311) of the first element (3) and (20) of the plane end piece (202) of the second element (2).

These connectors (1) have been tested and used to implement a process for the heat treatment of coils (7) of copper tubes (5a, 5b) with circulation of gaseous fluid inside the tube at high pressure (0.7 MPa), necessary due to the length of the tube (up to 4000 m) as shown in FIGS. 6 and 7.

Paradoxically, it is found that the pressure resistance of the connectors according to examples 1 and 2 was better than the resistance obtained with the connectors according to examples 3 and 4, although the flared end (51) is not tightened between the sealing surfaces as in the examples 3 and 4.

FIG. 6 is a block diagram that illustrates a stack of 5 coils (7) installed on a device (8) for stacking coils (7) comprising a base (84) and two side manifolds (80) and (81), one (80) for supply and the other (81) for return, connected to an inlet (82) and an outlet (83) respectively.

Five flexible tubes (6, 61) are connected to each manifold. A first element (3) fitted with its locking system (4) is permanently fixed to the free end of each of these five tubes (61).

Furthermore, the ends of the tube of each coil (7) are fitted with the said second element (2) flared as a function of the type of connector (1).

Each coil (7) is manually connected to the manifolds by immediate formation of the connector (1).

Once the stack of coils has been formed on the trays in device (8) according to FIG. 6, device (8) is inserted into a continuous furnace (9) as shown in FIG. 7, where reference 90 refers to a lock, reference 91 a heating zone (typically at 600° C.) and reference 92 is a cooling zone.

This figure does not show the manifolds (80, 81) or the associated feed and return means for the gaseous fluid circulating inside the tubes while the device (8) is moving inside the continuous furnace (9) at high pressure (of the order of 0.7 MPa or more).

Once the heat treatment is finished, the said second elements (2) are separated from the first elements (3), in order to release the coils. The ends of the tubes (5) are cut to recover the said first elements (3) for later reuse, and are then treated in the normal way.

ADVANTAGES OF THE INVENTION

The invention firstly solves an important problem in the treatment of copper tubes, which is a connector for tubes, capable of providing a seal at high temperature and high pressure, and reusable.

The seal at high temperature and high pressure was a difficult problem to solve, considering successive heating and cooling cycles and all associated expansion problems. Without this seal, it was impossible to use a continuous furnace or any other furnace, since gaseous fluid leaks containing miscellaneous residues would quickly have made the furnace dirty.

The removable and reusable nature of the connector makes it an important element in the economical treatment of copper tubes.

Secondly, the connector according to the invention makes it possible to use the same equipment regardless of the diameter (typically 5 to 20 mm) of the tubes to be treated, namely devices (8) equipped with manifolds (60, 81) fitted with flexible tubes (61), at the end of which the said first elements (3) are fixed with their claw (4). One important practical and economic advantage of the invention is that the connector is in two parts, the most important part due to its cost, weight or volume (the said first element (3) and the said claw (4) type locking/unlocking system) being located in a fixed manner on equipment (in this case device (8)), the least important part (the said second element (2)) with a variable inside diameter being assembled on the ends of the tubes to be treated.

The connectors (1) according to the invention are used in applications in any industrial or laboratory equipment and processes in which fluids circulate at high temperature and high pressure, in tubes which must periodically or frequently be separated from the complete device.

What is claimed is:

1. Connector (1) for two tubes (5a, 5b, 6) gas tight at temperatures between ambient temperature and a usage temperature of at least 600° C., by a cooperation of a first element (3) fixed to a first tube (6) and a second element (2) forming a sleeve for a second tube (5a, 5b) fitted with a flared part (50, 51, 52, 53) comprising a contact surface at its end, using a system (4) for locking/unlocking the first (3) and second (2) elements, comprising a spring (44) compressing the flared part (50, 51, 52, 53) into contact with a sealing surface (31, 310, 311, 312) of the first element (3), to form a seal using a sealing element (20, 200, 201, 202, 203) on the second element (2), characterized in that:

a) the diameter of the sealing element of the second element varies with the diameter of the second tube (5a, 5b), while the sealing surface of the first element remains constant regardless of the diameter of the second tube, b) the contact surface forming the seal by compression of the flared part (50, 51, 52, 53) comprises at least a sealing circle (11) formed by a tangential contact with variable diameter depending on the diameter of the second tube, between the flared part and the sealing surface, in order to seal the connector regardless of the temperature and corresponding expansion of the connector, c) the materials forming the connector (1) are chosen from materials which have mechanical characteristics at least equivalent to the characteristics of the second tube at the same usage temperature.

2. Connector according to claim 1, in which the flared part is curved, and the sealing surface is planar.

3. Connector according to claim 2, in which said flared part is formed by an annular protrusion (51) (310).

4. Connector according to claim 1, in which the contact part on the said sealing surface is curved, and the contact part on the flared part (52, 53) is planar.

5. Connector according to claim 4, in which the sealing surface comprises two circular ribs (38) forming two sealing arcs (110, 111) in which the sealing element comprises at least one circular rib (24) with a radius intermediate between the radius of the said two arcs (110, 111), in order to provide uniform compression.

6. Connector according to claim 1, in which the locking/unlocking system form a claw and in which:

a) the said first element (3) also comprises a cylindrical external surface (32) providing axial guidance for the claw (4) and the said spring (44), and a means, for limiting the axial displacement of the said claw (4), and a cylindrical sealed connection end piece (30) to the first tube (6), b) the second element (2) also has an external guide surface (21) with a predetermined diameter, and an internal surface (23) with a variable inside diameter adapted to the inside diameter of the second tube (5a, 5b), c) the claw (4) forms a first cylindrical guide ring (40) sliding on the external cylindrical surface (32) of the first element (3), with a recess (41) forming a cage for the spring (44), a second cylindrical guide ring (42) rigidly attached to the first ring (40) and sliding on the external surface (21) of the second element (2), and comprising locking/unlocking means (43) of the second element (2) with the second cylindrical ring (42).

7. Connector (1) according to claim 6 in which the cooperation is of the conical type, in which the first element (3) is a female element in which the sealing surface is an internal conical surface (310) fitted with circular ribs (38), in which the second element (2) is a male element comprising a conical end piece (200) with a trapezoidal end piece (201) forming a sealing element (20) that engages in the conical inside surface (310) and in which the flared part (50) is an annular protrusion (51).

8. Connector (1) according to claim 6 in which the cooperation is of the conical type, in which the first element (3) is a male element using an external conical surface (312) fitted with circular ribs (38) as the sealing surface, in which the second element (2) is a female element comprising a conical end piece (203) forming the sealing element (20), into which the external conical surface (312) fits, and in which the flared part (50) is a conical end piece (53).

9. Connector (1) according to claim 6 in which the first element (3) uses a plane sealing surface (311) fitted with circular ribs (38) as the sealing surface, in which the second element (2) comprises a plane end piece (202) forming a sealing element (20) and in which the flared part (50) is a plane ring (52).

10. Connector (1) according to claim 6, in which the first element (3) comprises a non-planar sealing surface (313, 314) forming a tangential contact with the flared end (52, 53, 54).

11. Connector (1) according to claim 6, in which the locking/unlocking means (43) of the second element with the second cylindrical ring comprises a means of axial displacement of the claw (4), (430), from a "locked" position to an "unlocked" position, by means of a spring (44) at "high tension" and "low tension" respectively, and a means of fixing and separating (43 and 22, 221 and 420) the second cylindrical ring (42) from the claw (4) and the second element (2).

12. Connector (1) according to claim 11, in which the displacement means and the fixing/separation means comprises engagement or cooperation of a cam (431) attached to the claw (4), and fitted with an arm (430) rotating it, with a recess or groove (220) in the second external guide surface (21) of the second element (2), in order to cause axial displacement of the second element (2) and compression of the flared part (50).

13. Connector (1) according to claim 11, in which the means of displacement comes into contact with the first element (2) and the fixing/separation means consists of cooperation between pins (221) on the said second element (2) and notches or recesses (420) on the end of the second cylindrical ring (42).

14. Connector (1) according to claim 6, in which the return force of the spring (44) in the "locked" position can be adjusted by choosing a variable displacement of the claw (4) to fix the second cylindrical ring and the second element.

15. Connector (1) according to claim 1 wherein said first element and/or said second element is formed from metal and/or ceramic.

16. Connector (1) according to claim 8, in which the pressure exerted by the spring is chosen so as to seal the connector at 600° C.

17. Process for manufacturing a connector (1) according to claim 1, in which:

a) the first (3) and second (2) elements, the locking/unlocking system (4) are supplied with the spring (44), the first (6) and second (5) tubes, b) the first element (3), the locking/unlocking system (4) and the spring (44) are assembled, followed by the first tube (6), by threading (60), c) one end of the second tube (5) is inserted into the second element (2), and the flared end (50, 51, 52, 53, 54) is formed, d) the first and second elements are connected.

18. Connector according to claim 4 in which the sealing surface comprises two circular ribs (38) forming two sealing arcs (110, 111) and in which the sealing element comprises a least one circular rib (24) with a radius intermediate between the radius of the two arcs (110, 111) and two other circular ribs (24) squeezing the two sealing arc on the inside and outside, in order to provide uniform compression.

* * * * *